US012645645B2

(12) United States Patent
Raut

(10) Patent No.: US 12,645,645 B2
(45) Date of Patent: Jun. 2, 2026

(54) DYNAMIC THREADING AND ADAPTIVE PARTITIONING BASED PARALLEL COMPRESSION AND RANDOM-ACCESS POINT SPECIFICATION BASED PARALLEL DECOMPRESSION

(71) Applicant: Advanced Micro Devices, Inc., Santa Clara, CA (US)

(72) Inventor: Samantray Biplab Raut, Bangalore (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/786,349

(22) Filed: Jul. 26, 2024

(65) Prior Publication Data

US 2026/0030213 A1      Jan. 29, 2026

(51) Int. Cl.
G06F 16/174 (2019.01)

(52) U.S. Cl.
CPC ................................. G06F 16/1744 (2019.01)

(58) Field of Classification Search
CPC .................................................. G06F 16/1744
See application file for complete search history.

(56) References Cited

U.S. PATENT DOCUMENTS

| | | | | |
|---|---|---|---|---|
| 6,618,728 B1 * | 9/2003 | Rail | ........................ | H03M 7/30 |
| 8,270,742 B1 | 9/2012 | Lee | | |
| 8,336,056 B1 * | 12/2012 | Gadir | .................... | G06F 9/5027 |
| | | | | 718/100 |
| 8,769,450 B1 | 7/2014 | Tian et al. | | |
| 9,229,869 B1 * | 1/2016 | Parakh | ................ | G06F 12/0871 |
| 9,484,954 B1 * | 11/2016 | Gopal | ................. | H03M 7/4037 |
| 11,178,398 B2 | 11/2021 | Raut | | |
| 11,412,266 B2 | 8/2022 | Aksu et al. | | |
| 2008/0098160 A1 * | 4/2008 | Slyz | ........................ | G06F 8/658 |
| | | | | 711/E12.001 |
| 2009/0012982 A1 * | 1/2009 | Merchia | .................. | H03M 7/30 |
| 2014/0223029 A1 * | 8/2014 | Bhaskar | .............. | H03M 7/4006 |
| | | | | 709/247 |
| 2015/0312243 A1 * | 10/2015 | Ponsford | ............. | G06F 21/6236 |
| | | | | 713/193 |
| 2021/0076054 A1 * | 3/2021 | Guo | ........................ | H04N 19/70 |

* cited by examiner

*Primary Examiner* — Marc S Somers
(74) *Attorney, Agent, or Firm* — Kevin T. Cuenot

(57)                    ABSTRACT

Hardware processor-based data compression includes subdividing source data into a plurality of partitions. A partition size for the subdividing is selected based on a search window size of a compression technique and a cache size of the hardware processor. A number of the plurality of partitions is selected based, at least in part, on a size of the source data and the partition size. Compressed data is generated by the hardware processor by performing multi-threaded compression in which a plurality of threads execute the compression technique on the plurality of partitions in parallel. Some aspects include prepending a random-access point (RAP) metadata frame by multi-threaded compression at a start of the plurality of partitions to enable the multi-threaded and parallel decompression. The RAP metadata frame is interpretable to enable single-threaded decompression by legacy decompressors.

20 Claims, 8 Drawing Sheets

200

Receive source data
202

Obtain a size of the source data
204

Obtain search window size of compression technique to be used to compress the source data
206

Obtain cache size of a hardware processor that will perform multi-threaded compression
208

Calculate search window factor based on search window size and cache size
210

Select partition size for subdividing source data into partitions
212

Select number of partitions to create from the source data
214

Select number of threads to use in multi-threaded compression
216

Subdivide the source data into a plurality of partitions
218

Perform multithreaded compression on each partition to generate a plurality of segments
220

Generate a RAP metadata frame
222

Generate compressed data by combining the segments with the RAP metadata frame
224

200

Header
118

| RAP Magic Word 302 | RAP Metadata length bytes 304 | Number of Primary Threads 306 | Number of Child Threads 308 |
|---|---|---|---|
| Primary Thread-1 RAP Offset 310 | Primary Thread-1 RAP Length 312 | Primary Thread-1 Decompressed Length 314 | ... |
| ... | Primary Thread-N RAP Offset 316 | Primary Thread-N RAP Length 318 | Primary Thread-N Decompressed Length 320 |
| Child Thread-1 RAP Offset 322 | Child Thread-1 RAP Length 324 | ...    Child Thread-N RAP Offset 326 | Child Thread-N RAP Length 328 |

Receive compressed data
502

Parse header to detect magic word and start
of segments
504

Set starting point for decompression as the
start of the segments
506

Perform decompression on segments
sequentially to recover source data
508

600

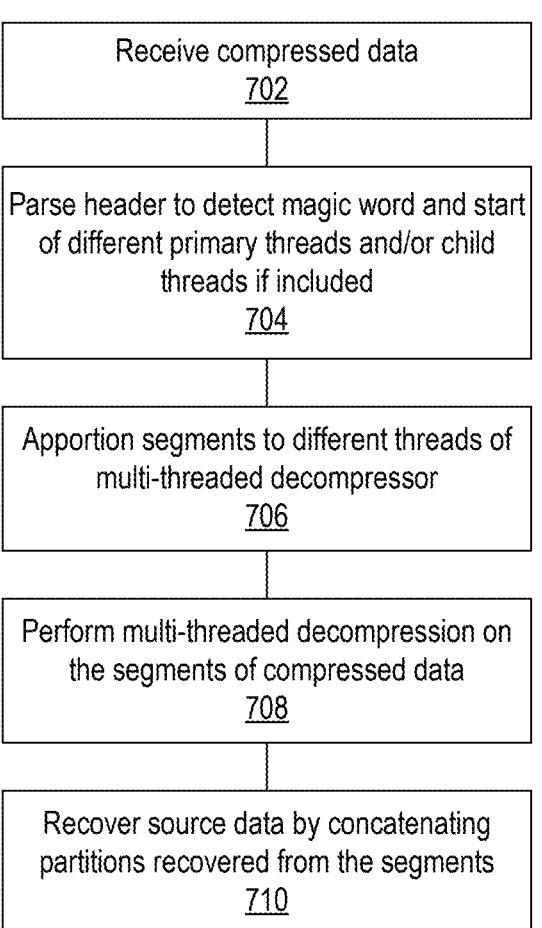

700

Receive compressed data
702

Parse header to detect magic word and start
of different primary threads and/or child
threads if included
704

Apportion segments to different threads of
multi-threaded decompressor
706

Perform multi-threaded decompression on
the segments of compressed data
708

Recover source data by concatenating
partitions recovered from the segments
710

FIG. 7

DYNAMIC THREADING AND ADAPTIVE PARTITIONING BASED PARALLEL COMPRESSION AND RANDOM-ACCESS POINT SPECIFICATION BASED PARALLEL DECOMPRESSION

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to data compression and decompression.

BACKGROUND

Data compression refers to a technological process performed by hardware in which source data specified as a particular number of bits is encoded (e.g., compressed) into compressed data formed of fewer bits than the source data. The size of the data, as compressed, is reduced compared to the size of the original, uncompressed data. Lossless compression is a type of compression that uses an invertible encoding process meaning that the original, uncompressed data may be recovered from the compressed data without any loss of information.

There are a variety of different types of lossless data compression techniques available. Example compression techniques include, but are not limited to, LZ4, LZ4HC, Snappy, ZLIB, LZMA, ZSTD, and BZIP2. In general, each compression technique utilizes a different Application Programming Interface (API) set and uses a different specification for representing compressed data. That is, there is no "one size fits all" specification for representing compressed data that has been standardized across different compression techniques.

With respect to available compression techniques, while some are capable of performing compression of source data in parallel using multiple threads, others are not. In general, data that has been compressed using a parallel compression technique (e.g., a multi-threaded compression technique) requires that decompression also be performed in parallel and mirror that of the compression. This limits the types of computing systems that are able to decompress data once compressed using a multi-threaded compression technique.

SUMMARY

One or more embodiments of the disclosed technology relate to a method. The method includes subdividing source data into a plurality of partitions. A partition size for the subdividing is selected based on a search window size of the underlying compression technique and a cache size of a hardware processor. A number of the plurality of partitions is selected based, at least in part, on a size of the source data and the partition size. The method includes generating, by the hardware processor, compressed data by performing multi-threaded compression in which a plurality of threads execute the compression technique on the plurality of partitions in parallel.

The foregoing and other implementations can each optionally include one or more of the following features, alone or in combination. Some example implementations include all the following features in combination.

In some aspects, a number of the plurality of threads is selected based on the maximum number of threads supported by the hardware processor and the number of the plurality of partitions.

In some aspects, the method includes prepending a Random-Access Point (RAP) metadata frame to segments of the compressed data. The RAP metadata may be prepended without deviating or disturbing the single-threaded compressed data. The RAP metadata frame is interpretable by a decompressor to enable multi-threaded and single threaded decompression.

In some aspects, the method includes decompressing the compressed data using a single threaded decompressor.

In some aspects, the method includes decompressing the compressed data using a multi-threaded decompressor.

In some aspects, the RAP metadata frame specifies a number of primary threads and a number of child threads.

In some aspects, the RAP metadata frame specifies an offset and a length for each segment of the compressed data.

In some aspects, the RAP metadata frame also specifies a decompressed length for each segment of the compressed data.

In some aspects, the RAP metadata frame specifies an offset and a length for each sub-segment of the compressed data related to an optional child thread within a segment of the compressed data.

In some aspects, the number of the plurality of partitions is further selected based on the search window size of the compression technique.

In some aspects, the partition size is selected to fit within a smallest level of cache of the hardware processor.

In some aspects, the selecting of the partition size includes calculating a search window factor based on the search window size of the underlying compression technique and the cache size of the hardware processor and generating a product of the search window size and the search window factor.

In some aspects, when the search window size or the size of the source data is less than a size of a level 1 cache memory of the hardware processor, the method includes setting the search window factor to a positive integer value such that the product of the search window size and the search window factor is less than the size of the level 1 cache memory.

In some aspects, the search window size is less than a size of a level 2 cache memory of the hardware processor (e.g., and greater than the size of a level 1 cache memory). The method includes setting the search window factor to a positive integer value such that the product of the search window size and the search window factor is less than the size of the level 2 cache memory.

In some aspects, the search window size is greater than or equal to a size of a level 2 cache memory of the hardware processor and less than a size of a level 3 cache memory of the hardware processor divided by a number of cores of the hardware processor that share the level 3 cache memory. The method includes setting the search window factor to a positive integer value such that the product of the search window size and the search window factor is less than a size of the level 3 cache memory of the hardware processor divided by the number of cores of the hardware processor that share the level 3 cache memory.

In some aspects, the search window size is greater than or equal to the size of the level 3 cache memory of the hardware processor divided by the number of cores of the hardware processor that share the level 3 cache memory. The method includes setting the search window factor to a positive integer value such that the product of the search window size and the search window factor is greater than or equal to the size of the level 3 cache memory of the hardware processor divided by the number of cores of the hardware processor that share the level 3 cache memory and less than the size of the source data divided by a number of cores (e.g., the total number of cores) available on the hardware processor.

One or more embodiments relate to a system. The system includes a hardware processor configured to perform operations. The operations include receiving compressed data including a RAP metadata frame followed by a plurality of segments. The operations include decompressing the compressed data by implementing a single-threaded decompressor by locating a start of the plurality of segments of the compressed data based on an offset indicated by a RAP metadata length field of the RAP metadata frame and performing single-threaded decompression starting at the start of the plurality of segments.

In some aspects, the hardware processor is configured to perform operations including decompressing the compressed data using a multi-threaded decompressor by distributing different ones of the plurality of segments to each of a plurality of threads based on thread offsets and thread lengths specified in the RAP metadata frame.

In some aspects, the multi-threaded decompressor is used as an alternative to the single-threaded decompressor.

In some aspects, the plurality of segments abut one another.

In some aspects, the compressed data is generated using a multi-threaded compressor.

One or more embodiments relate to a system including a memory and a hardware processor operable to access compressed data in the memory. The compressed data includes a plurality of segments and a RAP metadata frame. The RAP metadata frame precedes the plurality of segments. The RAP metadata frame includes a RAP magic word field, a RAP metadata length field, a number of primary threads field, a number of child threads field, and one or more sets each including a primary thread offset, a primary thread RAP length, and a primary thread decompressed length. A number of the one or more sets is equal to a number specified in the number of primary threads field. The hardware processor is operable to decompress the compressed data by indexing to the plurality of segments based on the RAP metadata frame.

In some aspects, the compressed data includes one or more further sets each including a child thread offset and a child thread RAP length. A number of the one or more further sets is equal to a number specified in the number of child threads field.

In some aspects, the hardware processor executes a single-threaded decompressor configured to perform single-threaded decompression starting at a start of the plurality of segments based on an offset specified in the RAP metadata length field of the RAP metadata frame. The single-threaded decompressor is capable of performing the single-threaded decompression without deviating from the single-threaded compressed data format.

In some aspects, the hardware processor executes a multi-threaded decompressor configured to perform multi-threaded decompression in which different ones of the plurality of segments are distributed to each of a plurality of threads based on thread offsets and thread lengths specified in the RAP metadata frame.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 3 illustrates an example of a header as generated by the compression framework illustrated in FIG. 1.

FIG. 7 illustrates a method for performing decompression of compressed data in accordance with one or more embodiments of the disclosed technology.

DETAILED DESCRIPTION

Figure 1:
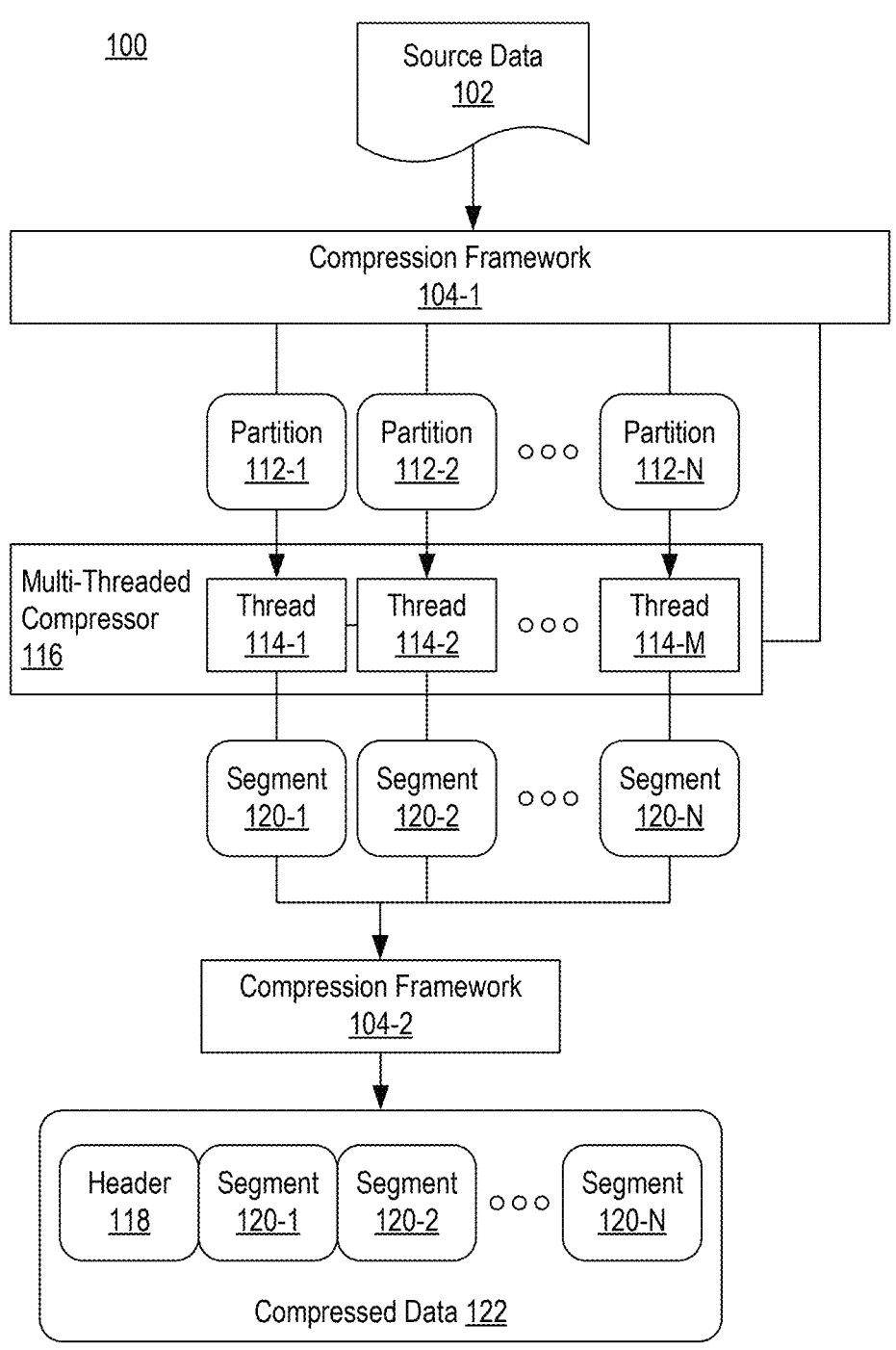
FIG. 1 illustrates an executable architecture for performing data compression in accordance with one or more embodiments of the disclosed technology.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to data compression and decompression. In accordance with the inventive arrangements described within this disclosure, methods, systems, and computer program products for performing lossless data compression and decompression are disclosed. The inventive arrangements provide lossless multi-threaded data compression and lossless multi-threaded decompression. The data compression and decompression are adaptive with respect to the data being processed and the particular hardware processor used. The dynamic aspects of the inventive arrangements provide improved (e.g., faster) runtime performance for performing compression and/or decompression using hardware.

The inventive arrangements further support lossless decompression using a single-threaded decompressor. As such, while source data may be compressed using a multithreaded and adaptive process, both multi-threaded decompressors and legacy, single-threaded decompressors may be used to decompress the data. The compressed data is compliant with legacy, single-threaded decompressors.

In one or more embodiments, a Dynamic Threading and Adaptive Partitioning (DTRAP) is employed to implement parallel compression. Certain aspects of the compression operations adapt dynamically to the operating context of the compressor. That is, certain aspects of the compression performed are determined based on selected parameters, wherein one or more of the selected parameters are ascertained at runtime. By comparison, other conventional compression techniques are fixed or static across different compression jobs. The inventive arrangements are capable of dynamically adapting to different hardware processors and/ or different source data and/or different underlying compression techniques.

For example, the partition size used to partition the source data may be dynamically determined or selected based on parameters such as a search window size of the particular compression technique being used and a cache size of the hardware processor being used. In another example, the number of partitions generated from the source data may vary based on a size of the source data, the partition size, and/or the search window size. In still another example, the number of threads used in performing multi-threaded compression may be selected dynamically.

In one or more embodiments, Random-Access Point (RAP) Specification based parallel decompression is performed. The compression techniques described herein are capable of generating one or more segments of compressed data and prepending a RAP metadata frame to the segments. The RAP metadata frame contains metadata describing various aspects of the segments of compressed data to be described herein in greater detail below. The metadata specified by the RAP metadata frame, which travels with the segments as part of the compressed data, enables both multi-threaded decompressors and single-threaded decompressors to decompress the compressed data.

In addition to allowing both multi-threaded and single-threaded decompressors to decompress the compressed data, the adaptability of the compression techniques described herein provide improved runtime performance over other conventional compression and/or decompression techniques. For example, the inventive arrangements, when used in combination with available compression techniques, are capable of providing significant improvement to runtime performance.

Further aspects of the inventive arrangements are described below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an executable architecture 100 for performing data compression in accordance with one or more embodiments of the disclosed technology. Architecture 100 may be executed by a data processing system and, more particularly, by one or more hardware processors of the data processing system. In one or more embodiments, architecture 100 may be executed by a Central Processing Unit (CPU). The inventive arrangements enable a CPU to achieve increased compression (and decompression) performance over other approaches. In some cases, the CPU performance may rival or surpass that of a Graphics Processing Unit (GPU) executing conventional compression and/or decompression techniques. Still, in one or more embodiments, architecture 100 may be executed by a GPU which may provide a greater degree of performance compared to a CPU. An example of a data processing system that is capable of performing the operations described within this disclosure is described in connection with FIG. 8.

In the example of FIG. 1, compression framework 104 is illustrated as two separate blocks including compression framework 104-1 and compression framework 104-2. Compression framework 104 represents executable functions performed in accordance with the inventive arrangements. In one or more embodiments, compression framework 104 is embodied as a set of APIs that support one or more or all of the compression operations described herein. The APIs may support and/or integrate with APIs provided by available compression techniques such as, for example, LZ4, LZ4HC, Snappy, ZLIB, LZMA, ZSTD, and BZIP2.

In one or more other embodiments, the computer-readable program instructions represented by compression framework 104 may be integrated into existing or to be developed compression techniques. For example, the computer-readable program instructions represented by compression framework 104 (e.g., the APIs) may be integrated into, or added to, conventional compression techniques. As an illustrative example, compression framework 104 may be included in the API of one or more conventional compression techniques as opposed to existing independently of the compression techniques.

In any case, compression framework 104 may be used in any of a variety of contexts including, but not limited to, video systems, data transfer/transmission systems, data storage and/or retrieval systems, or the like.

Figure 2:
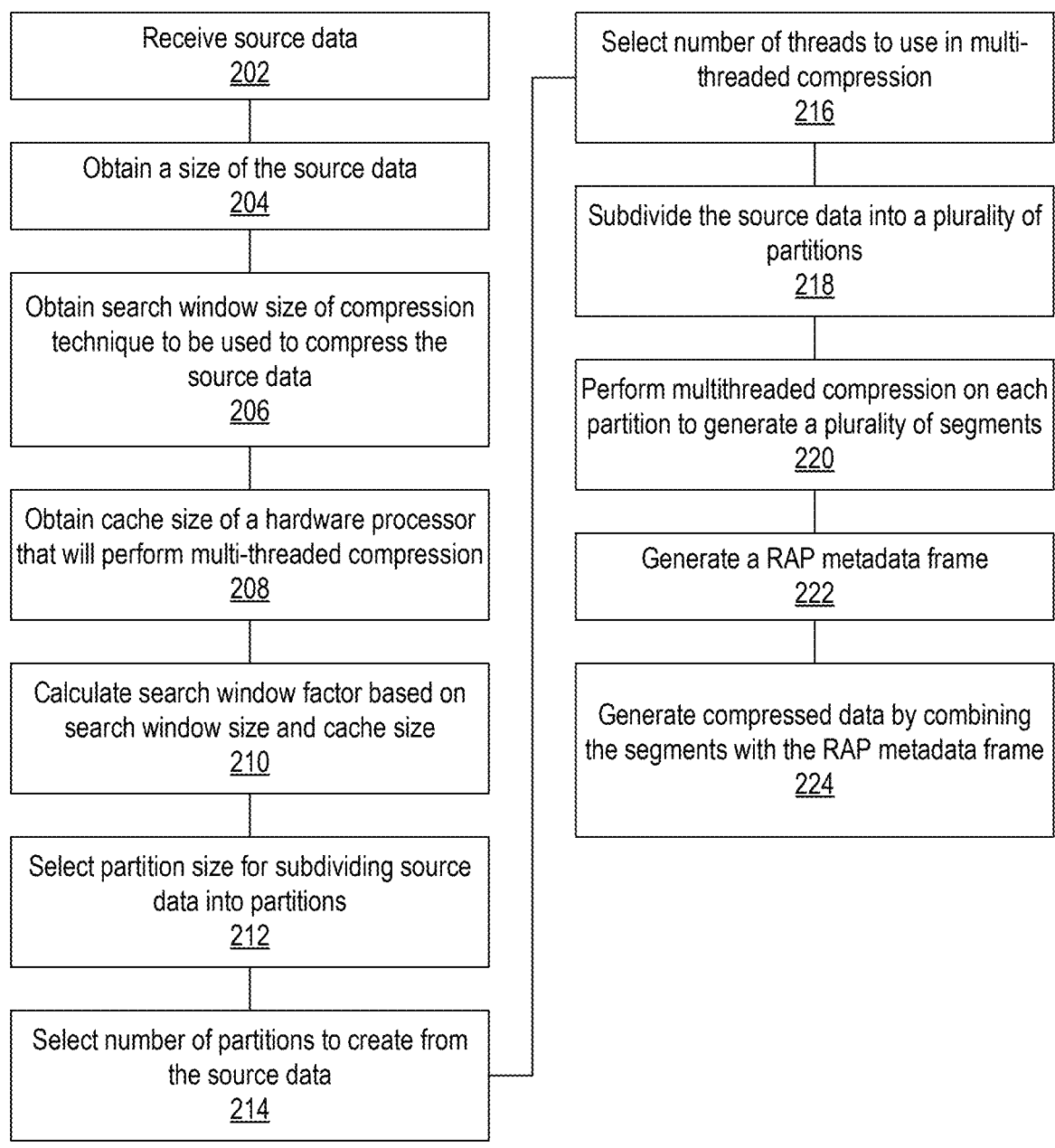
FIG. 2 illustrates a method for performing data compression in accordance with one or more embodiments of the disclosed technology.

FIG. 2 illustrates a method 200 for performing data compression in accordance with one or more embodiments of the disclosed technology. Method 200 may be performed by architecture 100 of FIG. 1.

Referring to FIGS. 1 and 2 collectively, in block 202, compression framework 104-1 receives source data 102. Source data 102 may be a file, a data stream, or other type of data. The particular format of source data 102 may vary based on the particular context or application in which architecture 100 is being used.

In block 204, compression framework 104-1 obtains a size of source data 102. In one or more embodiments, compression framework 104-1 is capable of invoking a function that measures or otherwise determines the amount of data (e.g., in bytes) included in source data 102. In one or more other embodiments, the size of the source data 102 is also passed along with the source data to the compression framework 104-1. In block 206, compression framework 104-1 obtains a search window size of the particular compression technique to be used to compress source data 102 by multi-threaded compressor 116.

In general, a search window, in reference to a compression technique, refers to a portion of contiguous data, e.g., a window of data, of previously observed data sequences of source data 102 that the compression technique is capable of comparing against the current observed data sequence of source data 102. The search window is moved across source data 102 like a sliding window. As the search window is moved, upon detecting a match between data in the search window and a data sequence in source data 102, the data sequence of source data 102 may be replaced with a reference to the matched data sequence of the search window. The search window size refers to the amount of contiguous eters that depend on the search window factor. Example 1 illustrates pseudo code for calculating the search window factor in accordance with one or more embodiments of the disclosed technology.

EXAMPLE 1

```
IF ((search_window_size OR size_of_source_data) < level_1_cache_size)
THEN search_window_factor is positive integer such that (search_window_size *
    search_window_factor) < level_1_cache_size
IF (search_window_size < level_2_cache_size)
THEN search_window_factor is a largest positive integer such that
    (search_window_size * search_window_factor) < level_2_cache_size
IF ((search_window_size ≥ level_2_cache_size) AND (search_window_size <
    (level_3_cache_size / num_cores)))
THEN search_window_factor is a largest positive integer such that
    (search_window_size * search_window_factor) < (level_3_cache_size /
    num_cores)
IF (search_window_size ≥ (level_3_cache_size / num_cores))
THEN search_window_factor is a largest positive integer such that
    (search_window_size * search_window_factor) ≥ ((level_3_cache_size /
    num_cores) AND (search_window_size * search_window_factor) <
    (source_datat_size / tot_cores)
``` data within the search window. The search window size typically differs from one compression technique to another. That is, the search window size may be specific to the data compression technique. A dictionary of previously encountered data sequences may be stored using data structures like Hash, for example, for providing fast lookup of the past data sequences.

In block 208, compression framework 104-1 obtains a cache size of a hardware processor that will perform the multi-threaded compression. In one or more embodiments, the cache size includes a size of level 1 cache memory of the hardware processor, a size of level 2 cache memory of the hardware processor, a size of level 3 cache memory of the hardware processor, and/or some combination or function of the size of the level 1 cache memory, the level 2 cache memory, and/or the level 3 cache memory of the hardware processor. The term "cache size" means the size or capacity of cache memory. The term "level 1 cache size" is the size of the level 1 cache memory of the hardware processor that will be used to perform the multi-threaded compression. The term "level 2 cache size" is the size of the level 2 cache memory of the hardware processor that will be used to perform the multi-threaded compression. The term "level 3 cache size" is the size of the level 3 cache memory of the hardware processor that will be used to perform the multi-threaded compression. The cache size of the hardware processor may be obtained by compression framework 104-1 via the system-specific APIs or utilities that are capable of querying hardware information, via direct CPU instruction to query the CPU information, or via another mechanism. Additionally, the operating system may publish the cache size information such that user-space applications and/or other libraries or utilities are able to read the information.

In block 210, compression framework 104-1 calculates a parameter called the "search window factor." The search window factor is a parameter that is dependent on, e.g., is a function of, the search window size and the cache size of the hardware processor. The search window factor is used to set, or select, the partition size in block 212. In this regard, compression framework 104-1 is capable of dynamically calculating the search window factor and/or other param- In Example 1, compression framework 104-1 compares the search window size and the size of the source data to the size of the level 1 cache memory of the hardware processor. In the case where the search window size or the size of the source data each is less than the size of the level 1 cache memory of the hardware processor, compression framework 104-1 is capable of setting the search window factor to a positive integer value such that the product of the search window size and the search window factor is less than the size of the level 1 cache memory. In this case, the search window factor may be calculated using Equation 1 below.

$$1 <= search\_window\_factor < (level\_1\_cache/ \qquad \text{Equation 1}$$
$$search\_window\_size);$$
$$\text{for } search\_window\_size < level\_1\_cache\_size \text{ or } input\_source\_length <$$
$$level\_1\_cache\_size$$

In Example 1, compression framework 104-1 compares the search window size to the level 2 cache size of the hardware processor. In response to the search window size being less than the level 2 cache size, compression framework 104-1 uses the level 2 cache size of the hardware processor in calculating the search window factor. In particular, compression framework 104-1 is capable of setting the search window factor to a positive integer. The search window factor is set to the largest positive integer possible so long as the product of the search window size and the search window factor is less than the level 2 cache size. In this case, the search window factor may be calculated using Equation 2 below.

$$1 \le search\_window\_factor < (level\_2\_cache\_size/ \qquad \text{Equation 2}$$
$$search\_window\_size);$$
$$\text{for } search\_window\_size < level\_2\_cache\_size$$

In the case where the search window size is not less than the size of the level 2 cache of the hardware processor (e.g., is greater than or equal to) and is less than a size of the level 3 cache memory of the hardware processor divided by a number of cores of the hardware processor that share the level 3 cache memory, compression framework 104-1 uses the level 3 cache size of the hardware processor in calculating the search window parameter. In Example 1 and the various Equations provided herein, "num_cores" specifies the number of cores of the hardware processor that share the level 3 cache. In particular, compression framework 104-1 is capable of setting the search window factor to a positive integer. In this case, the search window factor is set to the largest positive integer possible so long as the product of the search window size and the search window factor is less than the quotient of the level 3 cache size divided by the number of cores of the hardware processor that share the level 3 cache memory. In this case, the search window factor may be calculated using Equation 3 below.

$$1 < \text{search\_window\_factor} < \left(\text{level\_3\_cache\_size}/ \right. \qquad \text{Equation 3}$$
$$\left(\text{search\_window\_size} * \text{num\_cores}\right));$$
$$\text{for } \text{level\_2\_cache\_size} \leq \text{search\_window\_size} < \left(\text{level\_3\_cache\_size}/ \right.$$
$$\left. \text{num\_cores}\right)$$

In the case where the search window size is greater than or equal to the size of the level 3 cache memory of the hardware processor divided by the number of cores of the hardware processor that share the level 3 cache memory, compression framework 104-1 is capable of setting the search window factor to a positive integer value such that the product of the search window size and the search window factor is greater than or equal to the size of the level 3 cache memory of the hardware processor divided by a number of cores of the hardware processor that share the level 3 cache memory and less than the size of the source data divided by the number of cores available on the hardware processor. In Example 1 and the various Equations provided herein, "tot_cores" specifies the total number of cores of the hardware processor. In this case, the search window factor may be calculated using Equation 4 below.

$$\left(\text{level\_3\_cache\_size}/\text{num\_cores}\right) \leq \text{search\_window\_factor} < \qquad \text{Equation 4}$$
$$\left(\text{source\_data\_size}/\text{tot\_cores}\right);$$
$$\text{for } \text{search\_window\_factor} \geq \left(\text{level\_3\_cache}/\text{num\_cores}\right)$$

In general, a variety of hardware processors include multiple cores that may share level 3 cache memory. As illustrated in the foregoing examples, the level 3 cache size is divided by the number of cores that share that level 3 cache memory. In cases where the level 3 memory is not shared among multiple cores, the value of the parameter "number of cores of hardware processor that share level 3 cache" or "num_cores" in Example 1 is 1. In the case of the level 2 cache memory, such memory in this example is core-specific. That is, each core of the hardware processor is presumed to have a dedicated level 2 cache memory.

In cases where source data 102 is too small or too large, or the search window size is greater than (level_3_cache_size/num_cores), compression framework

104-1 is capable of setting the search window factor to a small value fitting the level 1 cache or the level 3 cache.

In block 212, compression framework 104-1 is capable of selecting a partition size for subdividing the source data into partitions. Within this disclosure, the term "partition" refers to a portion of source data 102 that, while subdivided, is still in uncompressed form. That is, each partition 112 has not yet undergone compression. Example 2 illustrates pseudo code for calculating the partition size in accordance with one or more embodiments of the disclosed technology.

EXAMPLE 2

$$\text{partition\_size} = \left(\text{search\_window\_size} * \text{search\_window\_factor}\right)$$

As illustrated in Example 2, compression framework 104-1 sets the partition size equal to the product of the search window size and the search window factor. In block 212, compression framework 104-1 sets the partition size to an amount of data that will fit within the available level 1 cache memory of the hardware processor in the case where the search window size or the amount of data to be compressed is less than the level 1 cache size. If the condition for using the level 1 cache is not met and the search window size is less than the level 2 cache size, the partition size is set to an amount of data that will fit within the available level 2 cache memory of the hardware processor. In the case where the condition for using level 2 cache is not met, and the partition size fits within the available level 3 cache memory, the partition size is set to fit within the available level 3 cache memory, and so forth. Thus, block 212 dynamically optimizes the partition size based on both the search window size and the cache memory. In general, the partition size is selected to fit within a smallest level of cache of the hardware processor possible. This process ensures that the data being processed, e.g., each partition, will fit within the closest (e.g., fastest) cache memory of the hardware processor possible and will be a near optimal factor of the sliding search window.

In block 214, compression framework 104-1 is capable of selecting a number of the partitions to create from source data 102. Compression framework 104 is capable of dynamically selecting the number of partitions 112. In the example of FIG. 1, the number of partitions is illustrated as N. Compression framework 104-1 is capable of subdividing source data 102 into a plurality of partitions 112 (shown as partitions 112-1, 112-2, through 112-N). In the example of FIG. 1, N is an integer value. In some cases, to be described herein in greater detail below, compression framework 104-1 generates a single partition (e.g., N is set to 1). In other cases, N is set to a value of 2 or more.

In one or more embodiments, compression framework 104-1 calculates the number of partitions to create from source data 102 using Equation 5 below.

$$\text{Number of } DRAP \text{ Partitions} = \left(\text{size\_of\_source\_data}/ \right. \qquad \text{Equation 5}$$
$$\text{partition\_size}\right) + \left(\left(\text{size\_of\_source\_data} \% \text{ partition size}\right) \geq$$
$$\text{partition\_size}/2\right)$$

In block 216, compression framework 104-1 is capable of selecting a number of the threads to use by multi-threaded compressor 116. Compression framework 104-1 is capable of dynamically selecting the number of threads 114 (e.g., 114-1, 114-2, through 114-M) to be used in performing multi-threaded compression by multi-threaded compressor 116. In the example of FIG. 1, the number of threads is illustrated as M, where M is an integer value. In some cases, the number of threads may be one (e.g., M is set to 1). In other cases, M is set to a value of 2 or more.

In one or more embodiments, the number of threads used by multi-threaded compressor 116 in architecture 100 is selected based on a maximum number of threads supported by the hardware processor of the data processing system executing architecture 100 or the hardware processor that will perform the multi-threaded compression. The number of threads 114 is also selected based on the number of the plurality of partitions 112 into which source data 102 is subdivided. In one or more embodiments, compression framework 104-1 calculates the number of threads used by multi-threaded compressor 116 using Equation 6 below.

$$DTRAP \text{ threads} = MIN(tot\_cores \text{ on hardware processor}, \quad \text{Equation 6}$$
$$DTRAP \text{ partitions})$$

Example 3 illustrates pseudo code for calculating the number of partitions to be generated from source data 102 corresponding to block 214 and the number of threads used by multi-threaded compressor 116 corresponding to block 216 in accordance with one or more embodiments of the disclosed technology. In Example 3, the number of threads is represented as DRAP_threads and the number of partitions is represented as DRAP_partitions.

EXAMPLE 3

```
IF (source_data_size < partition_size)
    DRAP_partitions = 1
    DRAP_threads = 1
ELSE
    DRAP_partitions = (source_data_size / partition_size) + ((
    source_data_size % partition_size) >= (partition_size / 2))
IF (max_threads >= DRAP_partitions)
    DRAP_threads = DRAP_partitions
ELSE
    DRAP_threads = max_threads
```

In Example 3, compression framework 104-1 sets the number of partitions equal to 1 in the case where the size of source data 102 is less than the partition size. In that case, compression framework 104-1 also sets the number of threads (DRAP_threads) equal to 1 as only one thread is required to process the single partition of source data 102.

In the case where the size of source data 102 is not less than (e.g., is greater than or equal to) the partition size, compression framework 104-1 sets the number of partitions based on a function of the size of source data 102, the partition size, which is derived from the search window size, and the cache sizes on the underlying hardware.

For example, compression framework 104-1 is capable of calculating the quotient of the size of source data 102 divided by the partition size. If the remainder of the division operation (size of source data/partition size) is greater than or equal to the partition size divided by a factor which is 2 in Example 3, the compression framework 104-1 sets the number of partitions equal to the result of the division operation (size of source data/partition size) plus 1. If the remainder of the division operation (size of source data/partition size) is less than the partition size divided by a factor which is 2 in Example 3, the compression framework 104-1 sets the number of partitions equal to the result of the division operation (size of source data/partition size). The factor may be set to a value other than 2.

In terms of threads, compression framework 104-1 computes the number of threads as a lower bound of the maximum number of threads supported by the hardware processor and the number of partitions. For example, Example 3 implements MIN(max_threads, DRAP_partitions). Compression framework 104-1 is configured to use all threads when the source data is large enough as determined based on the number of partitions. In cases where the source data is small, using all threads results in inefficient execution by the hardware processor and may result in longer runtimes than were fewer threads used. The inventive arrangements address this issue through adaptively partitioning and dynamically setting the number of threads to be used for compression.

In cases where the size of the source data 102 can be divided by the number of threads without a remainder, each thread may process a partition. In cases where a remainder does exist, the additional bytes corresponding to the remainder may be processed by any one of the threads as selected by compression framework 104-1.

In block 218, compression framework 104-1 is capable of subdividing source data into a plurality of partitions 112, where the number of partitions 112 is the number selected in block 214. Further, the partitions 112 have a size as selected in block 212. Appreciably, any remaining data may be added to any of the threads and added to the equally divided partition size of that thread.

In one or more embodiments, once partition_size and DTRAP_threads are determined in blocks 214 and 216, the final partition_size may be recomputed to account for unequal partitioning. For purposes of illustration in the pseudo code of Example 4 below, consider the last thread, though this may be the case for any one of the threads.

EXAMPLE 4

```
IF current_thread == total_threads-1
    partition_size = src_size / DTRAP_threads
    else
        partition_size = src_size / DTRAP_threads + src_size %
        DTRAP_threads
```

In block 220, multi-threaded compression is performed on partitions 112 to generate a plurality of segments. The hardware processor, for example, is capable of generating compressed data by performing multi-threaded compression in which the threads 114 execute the compression technique in parallel. Each thread 114 may execute the compression technique (e.g., an instance of the compression technique) such that multiple compression operations may be performed in parallel (e.g., concurrently). In one or more embodiments, each thread 114 has a separate memory region to compress its partition.

Thus, multiple partitions 112 corresponding to the number of threads 114 used, may be processed concurrently. Though the example of FIG. 1 illustrates each thread processing one partition 112, it should be appreciated that the number of partitions 112 to be processed may differ from the number of threads 114. In other words, N may not equal M. In that case, certain threads may process multiple segments 120 (e.g., segments 120-1, 120-2, through 120-N). Multi-threaded compressor 116 generates segments 120. Within this disclosure, the term "segment" refers to a partition 112 of source data 102 that has been compressed using a compression technique.

In block 222, compression framework 104-2 generates a Random-Access Point (RAP) metadata frame 118. RAP metadata frame 118 specifies metadata describing compressed data 122 that is being generated. In block 224, compression framework 104-2 generates compressed data 122. For example, as part of block 224, compression framework 104-2 is capable of concatenating segments 120. Further, as part of block 224, compression framework 104-2 is capable of prepending RAP metadata frame 118 to the concatenated segments resulting in compressed data 122. Thus, RAP metadata frame 118 precedes the plurality of segments 120.

Compressed data 122 may be stored in a memory of the same data processing system that performed the multi-threaded compression or sent to another data processing system or device.

The inventive arrangements address various shortcomings in available compression technology. For example, the inventive arrangements support parallel compression and decompression and use a data format for compressed data that does not break legacy, single-threaded decompressors. As discussed, RAP metadata frame 118 is prepended without deviating or disturbing the single-threaded compressed data format. This allows the inventive arrangements to be used with single-threaded compression techniques to render them multi-threaded thereby improving processing speed and computational efficiency.

The inventive arrangements support dynamic partitioning, whereas a variety of available compression techniques support only static partitioning (using a fixed number of partitions). Dynamic partitioning allows the inventive arrangements to adjust to changing factors such as the size of the source data while also accounting for the size of cache memories of the hardware processor(s) being used and the search window of the underlying compression technique. The inventive arrangements are capable of operating such that the data being compressed is able to fit within available cache memory of the hardware processor and process a multiple factor of the search window size. This efficient usage of hardware processor cache memory facilitates improved runtime and computational efficiency as the portions of data being compressed are more likely to fit within the closest (and thus fastest) cache memory of the hardware processor possible.

The inventive arrangements are capable of dynamically selecting the number of threads to be used for purposes of compression. As is described in greater detail below, the number of threads used in decompression need not be the same as the number of threads used for compression. For example, decompression may be performed using a single thread or using a plurality of threads that differ in number from the plurality of threads used for compression.

FIG. 3 illustrates an example of RAP metadata frame 118 as generated by compression framework 104. As discussed, RAP metadata frame 118 is prepended to the segments 120 as concatenated to form compressed data 122. In the example of FIG. 3, RAP metadata frame 118 includes different fields ordered as illustrated in FIG. 3 and is an example of a frame compatible with the RAP Specification. RAP metadata frame 118 begins with RAP magic word 302 that is reserved for storing a magic word (e.g., a value)

indicating that compressed data 122 uses the RAP Specification and includes RAP metadata frame 118 that may be interpreted and used to perform parallel decompression. That is, presence of the particular magic word in RAP magic word 302 indicates that RAP metadata frame 118 is present and provides the metadata necessary for decompressing the compressed data 122 in parallel (e.g., using multi-threaded decompression).

RAP metadata length bytes 304 is reserved for storing a value specifying the length of RAP metadata frame 118 in bytes. Number of primary threads 306 is reserved for storing a value specifying the number of primary threads included in compressed data 122. Number of child threads 308 is reserved for storing a value specifying the number of child threads included in compressed data 122.

Primary thread-1 RAP offset 310 is reserved for storing a value specifying the offset (e.g. in bytes) of a start of the first primary thread in compressed data 122. Primary thread-1 RAP length 312 is reserved for specifying a length in bytes of the first primary thread in compressed data 122. Primary thread-1 decompressed length 314 is reserved for storing the length of the first primary thread in decompressed form.

RAP metadata frame 118 may include additional sets of fields for each additional primary thread. For example, for each primary thread included in compressed data 122, RAP metadata frame 118 will include a primary thread RAP offset, a primary thread RAP length, and a primary thread decompressed length. The number of sets in RAP metadata frame 118 of [primary thread RAP offset, primary thread RAP length, primary thread decompressed length] will be equal to the value specified in number of primary threads 306. As illustrated, the last of such sets includes primary thread-N RAP offset 316, primary thread-N RAP length 318, and primary thread-N decompressed length 320.

Child thread-1 RAP offset 322 is reserved for storing a value specifying the offset (e.g. in bytes) of a start of a first child thread in compressed data 122. Child thread-1 RAP length 324 is reserved for specifying a length in bytes of the first child thread in compressed data 122. RAP metadata frame 118 may include additional sets of fields for each additional child thread. That is, for each child thread corresponding to a primary thread included in compressed data 122, RAP metadata frame 118 will include a child thread RAP offset and a child thread RAP length. The number of sets in RAP metadata frame 118 of [child thread RAP offset, child thread RAP length] will be equal to the value specified in number of child threads 308. As illustrated, RAP metadata frame 118 includes one or more additional sets up to child thread-N RAP offset 326 and child thread-N RAP length 328.

In general, the primary threads are associated with the segments. The child threads work in parallel on sub-segments in the primary thread's segment. Accordingly, the total number of child threads is the number of primary threads multiplied by the number of child threads.

In one or more embodiments, child threads are optional. Accordingly, in some cases, compressed data will include no child threads. In such cases, the value specified in number of child threads 308 will be zero. If zero child threads are specified, RAP metadata frame 118 will not include any [child thread RAP offset, child thread RAP length] sets.

RAP metadata frame 118 facilitates the use of multi-threaded decompression as well as single-threaded decompression to decompress compressed data 122. In cases where a decompressor does not support multi-threaded operation, the decompressor need only locate a start of segments 120 in compressed data 122 by parsing RAP metadata frame 118 to detect the magic word in RAP magic word 302 and the RAP metadata length bytes 304, thereby allowing the decompressor to jump to the start of segments 120 and perform decompression serially as a single-threaded process.

In cases where a decompressor does support multithreaded operation, the decompressor may parse RAP metadata frame 118 to determine the exact starting points of the various segments 120 included therein such that the segments may be apportioned out, e.g., distributed, to different threads that execute a decompression technique in parallel.

In conventional compression frameworks, certain fields such as the primary thread RAP offset and the primary thread RAP length are interspersed between the partitions as opposed to being grouped together into a frame that is prepended to the segments 120 as shown in FIG. 3. By prepending the fields of metadata as illustrated in FIGS. 1, 2, and 3, the segments abut one another meaning that consecutive segments are not separated by fields of metadata. As noted, the single-threaded compressed data format is left intact with the RAP metadata frame prepended thereto. When segments do not abut one another, as is the case with conventional compression frameworks, the compressed data becomes non-compliant with certain legacy decoders (decompressors). In consequence, the compressed data may only be decompressed using a decompressor capable of interpreting these fields as encountered between the segments. Accordingly, though a multi-threaded decompressor may interpret the fields and decompress the data as a multi-threaded process, a single-threaded decompressor (e.g., a legacy decompressor) would be unable decompress the data. The single-threaded decompressor would need to be reconfigured to be able to accurately interpret such fields when encountered between segments in order to ignore such data and accurately decompress the segments.

The ability to optionally include and/or specify child threads in RAP metadata frame 118 within compressed data 122 is a feature that is not supported in conventional compression techniques and/or frameworks.

Figure 4:
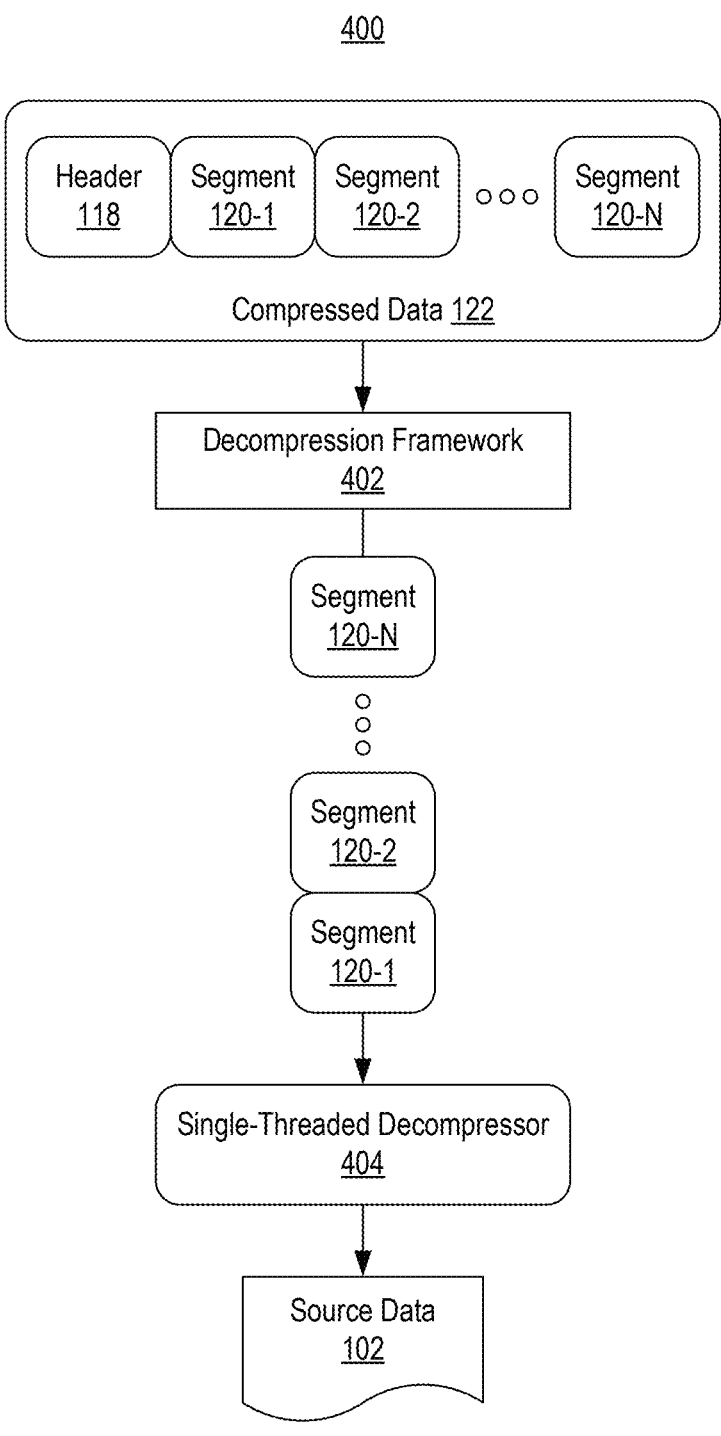
FIG. 4 illustrates an executable architecture for performing decompression of compressed data in accordance with one or more embodiments of the disclosed technology.

FIG. 4 illustrates an executable architecture 400 for performing decompression of compressed data in accordance with one or more embodiments of the disclosed technology. Architecture 400 illustrates single-threaded decompression that may be performed on compressed data 122 generated using architecture 100. Architecture 400 may be executed by a data processing system and, more particularly, by one or more hardware processors of the data processing system. The data processing system that implements architecture 400 may be the same data processing system that implements architecture 100 or a different data processing system. Like architecture 100, architecture 400 may be executed by a CPU or a GPU. An example of a data processing system that is capable of performing the operations described within this disclosure is described in connection with FIG. 8.

In the example of FIG. 4, a decompression framework 402 is illustrated. Decompression framework 402 represents executable functions performed in accordance with the inventive arrangements. In one or more embodiments, decompression framework 402 is embodied as a set of APIs to support decompression operations described herein. The APIs may support and/or integrate with APIs provided for decompression of data compressed using compression techniques such as, for example, LZ4, LZ4HC, Snappy, ZLIB, LZMA, ZSTD, and BZIP2.

In one or more other embodiments, the computer-readable program instructions represented by decompression framework 402 may be integrated into existing or to be developed decompression techniques (e.g., the APIs of such decompression techniques) as opposed to existing independently of the decompression techniques.

Figure 5:
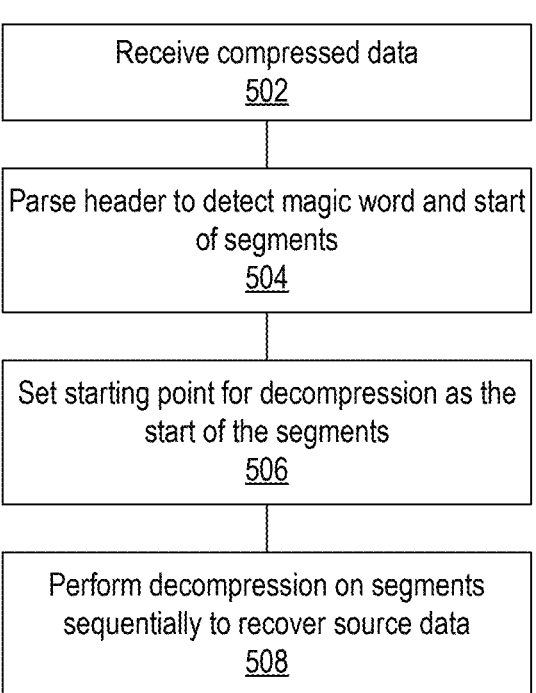
FIG. 5 illustrates a method for performing decompression of compressed data in accordance with one or more embodiments of the disclosed technology.

FIG. 5 illustrates a method 500 for performing decompression of compressed data in accordance with one or more embodiments of the disclosed technology. Method 500 may be performed by architecture 400 of FIG. 4.

Referring to FIGS. 4 and 5 collectively, in block 502, architecture 400 receives compressed data 122. As illustrated in FIG. 4 decompression framework 402 receives compressed data 122. In block 504, decompression framework 402 is capable of parsing the header to detect the magic word and the start of the segments 120 included in compressed data 122. For example, decompression framework 402 is capable of first detecting the magic word specified in RAP magic word 302 and detecting the value specified in RAP metadata length bytes 304. In block 506, decompression framework 402 sets a starting point within compressed data 122 for performing decompression. The starting point is the start of the segments. The start of segments 120 is the next byte following the end of RAP metadata frame 118, as specified by the value read from RAP metadata length bytes 304.

In block 508, single-threaded decompressor 404 is invoked to perform decompression on segments 120 of compressed data 122. For example, single-threaded decompressor 404 is capable of serially (e.g., sequentially) decompressing segments 120 to recover source data 102. As discussed, single-threaded decompressor 404 may serially decompress segments 120 as there are no fields of data specifying thread offsets and/or thread lengths between the concatenated segments.

In the example of FIGS. 4 and 5, decompression framework 402 may be invoked to determine the start of the segments and provide that starting location to single-threaded decompressor 404. In this manner, single-threaded decompressor 404 need not be modified to decompress the compressed data generated using multi-threaded compression. Instead, single-threaded decompressor 404 may use the value received to skip RAP metadata frame 118 at the beginning of compressed data 122, whether a file or a data stream, and decompress segments 120. As noted, various end of segment conditions (e.g., fields) typically included amongst the segments are excluded thereby enabling a legacy decompressor to operate on the data. The inventive arrangements, via use of the RAP Specification described herein, support raw block format (e.g., formats that do not utilize a metadata frame).

Alternatively, decompression framework 402 may be configured to strip or remove RAP metadata frame 118 from compressed data 122 leaving concatenated segments 120 that may be provided to single-threaded decompressor 404.

In the case where decompression framework 402 does not detect a magic word in compressed data 122, decompression framework 402 may pass compressed data 122 directly to single-threaded decompressor 404 for performing single-threaded decompression.

Figure 6:
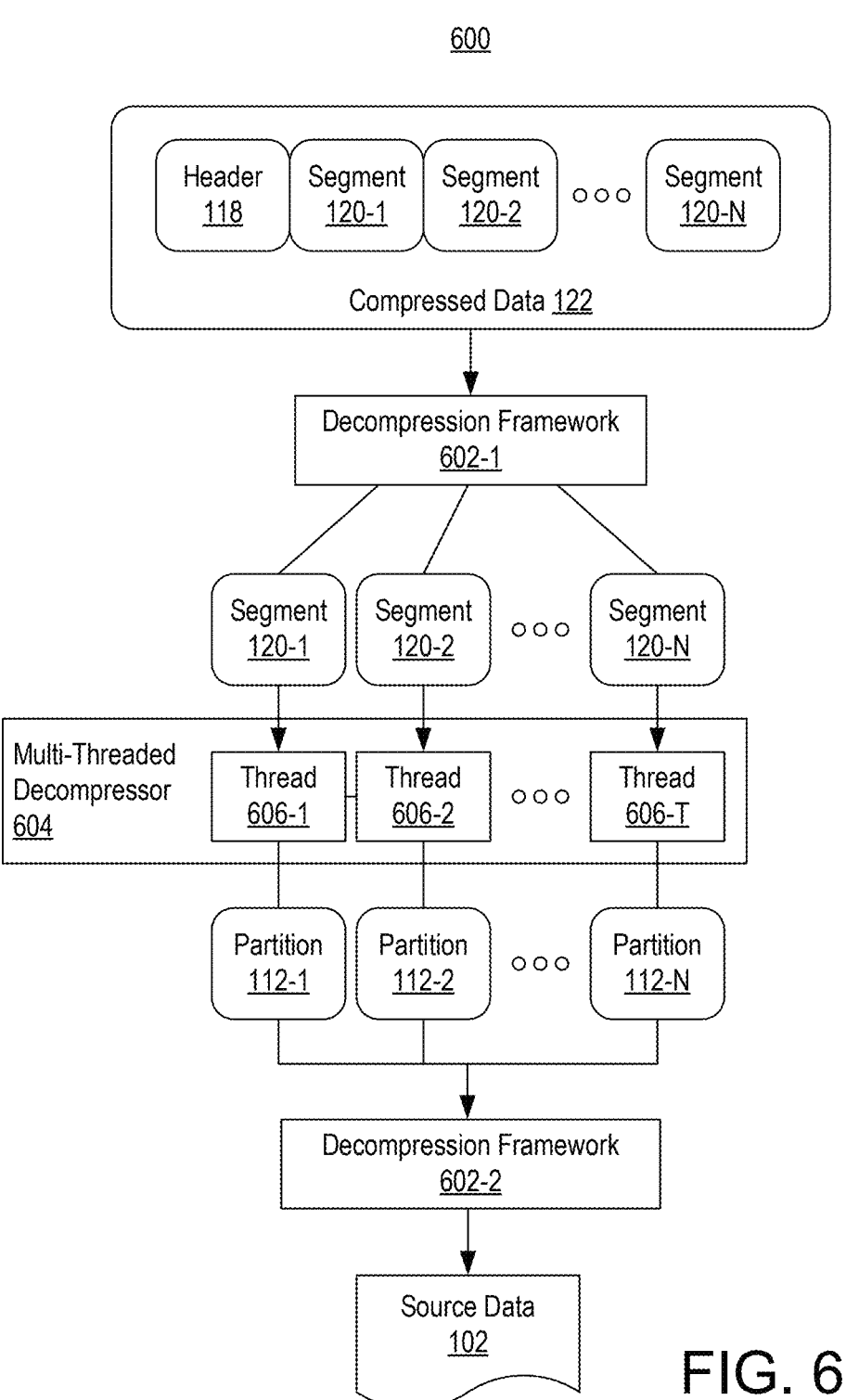
FIG. 6 illustrates an executable architecture for performing decompression of compressed data in accordance with one or more embodiments of the disclosed technology.

FIG. 6 illustrates an executable architecture 600 for performing decompression of compressed data in accordance with one or more embodiments of the disclosed technology. Architecture 600 illustrates a multi-threaded decompressor 604 that may operate on compressed data 122 as generated using architecture 100. Architecture 600 may be executed by a data processing system and, more particularly, by one or more hardware processors of the data processing system. The data processing system that implements architecture 600 may be the same data processing system that implements architecture 100 or a different data processing system. Like architecture 100, architecture 600 may be executed by a CPU or a GPU. An example of a data processing system that is capable of performing the operations described within this disclosure is described in connection with FIG. 8.

In the example of FIG. 6, a decompression framework 602 (e.g., shown as decompression framework 602-1 and decompression framework 602-2) is illustrated. Decompression framework 602 represents executable functions performed in accordance with the inventive arrangements. In one or more embodiments, decompression framework 602 is embodied as a set of APIs to support decompression operations described herein. The APIs may support and/or integrate with APIs provided for decompression of data compressed using compression techniques such as, for example, LZ4, LZ4HC, Snappy, ZLIB, LZMA, ZSTD, and BZIP2.

In one or more other embodiments, the computer-readable program instructions represented by decompression framework 602 may be integrated into existing or to be developed decompression techniques (e.g., the APIs of such decompression techniques) as opposed to existing independently of the decompression techniques.

FIG. 7 illustrates a method 700 for performing decompression of compressed data in accordance with one or more embodiments of the disclosed technology. Method 700 may be performed by architecture 600 of FIG. 6.

Referring to FIGS. 6 and 7 collectively, in block 702, architecture 600 receives compressed data 122. As illustrated in FIG. 6, decompression framework 602-1 receives compressed data 122. In block 704, decompression framework 602-1 is capable of parsing RAP metadata frame 118 to detect the magic word and the start of different primary threads and/or child threads (if included) in compressed data 122. In block 704, decompression framework 602-1 is capable of reading fields such as number of primary threads 306 and number of child threads 308. Decompression framework 602-1 also is capable of reading the primary thread RAP offset, the primary thread RAP length, and the primary thread decompressed length for each primary thread (e.g., as specified by the number of primary threads 306). Decompression framework 602-1 is further capable of reading any data for child threads (if included) such as child thread RAP offset and the child thread RAP length for each child thread.

Accordingly, the number of independent partitions and the locations of such partitions within compressed data 122 is known by multi-threaded decompressor 604. Since RAP metadata frame 118 specifies the child threads and the locations or regions of the child threads (if any) that collectively work for a primary thread, this data is known and available for performing multi-threaded decompression.

In block 706, decompression framework 602-1 is capable of apportioning segments 120 of compressed data to different threads 606 (e.g., threads 606-1, 606-2, through 606-T) of multi-threaded decompressor 604. Each primary thread is associated to one segment and may have one or more child threads acting on sub-segments. Decompression framework 602-1, for example is capable of indexing into compressed data 122, e.g., the plurality of segments 120, to apportion the segments to threads 606. Each thread 606 is capable of executing a decompressor therein such that two or more segments 120 of compressed data 122 may be decompressed in parallel (e.g., concurrently). In the example, there are T different threads, where T is an integer value of two or more. In the example, the segments 120 may not correspond to the number of threads on a one-to-one basis. In this regard, N may be unequal to T, e.g., larger or smaller.

In cases where the number of partitions 112 being decompressed is greater than the number T of threads 606, when decompressing more partitions/chunks than available threads, a list of partitions 112 is assigned per thread 606 to complete the decompression job. That is, the decompressor executing in a given thread will decompress the partitions in the list assigned to the thread.

Compression and decompression may be operative with unequal source size. Threads performing compression, for example, may act on partitions that may not be all equal in size. An example of this condition may be where remainder bytes are added to the last thread for compression. Similarly, the threads performing the decompression operation are capable of operating with unequal decompressed partition sizes.

In block 708, multi-threaded decompression is performed on segments 120 of compressed data 122. Each thread 606 used in the decompression is capable of executing a decompressor therein. Each thread 606 decompresses one or more segments 120 and outputs the corresponding partition 112 for each respective segment 120. In block 710, decompression framework 602-1 recovers source data 102 by concatenating the partitions 112 recovered from segments 120.

In one or more embodiments, each thread 606 has a separate memory region to decompress its partition.

In the case where decompression framework 602 does not detect a magic word in compressed data 122, decompression framework 602 may pass compressed data 122 directly for performing single-threaded decompression.

Figure 8:
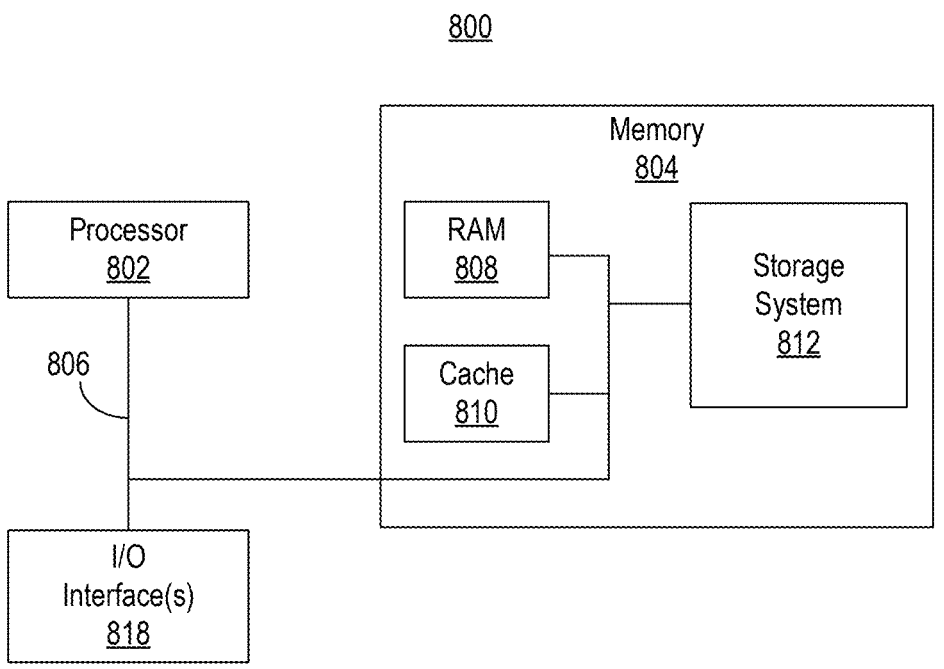
FIG. 8 illustrates an example implementation of a data processing system capable of executing the various architectures described herein.

FIG. 8 illustrates an example implementation of a data processing system 800. As defined herein, the term "data processing system" means one or more hardware systems configured to process data, each hardware system including at least one hardware processor and memory, wherein the hardware processor is programmed with computer-readable instructions that, upon execution, initiate operations.

Data processing system 800 can include a processor 802, a memory 804, and a bus 806 that couples various system components including memory 804 to processor 802. Processor 802 may be implemented as one or more processors. In an example, processor 802 is implemented as a CPU. In another example, processor 802 is implemented as a GPU. In still other examples, processor 802 may represent one or more CPUs and one or more GPUs. Processor 802 is an example of a hardware processor that is implemented as one or more circuits capable of carrying out instructions and/or operations embodied as computer-readable program instructions. The circuit may be an integrated circuit or embedded in an integrated circuit. Processor 802 may be implemented using a complex instruction set computer architecture (CISC), a reduced instruction set computer architecture (RISC), a vector processing architecture, or other known architectures. Example processors include, but are not limited to, processors having an x86 type of architecture (IA-32, IA-64, etc.), Power Architecture, ARM processors, GPUs, and the like.

Bus 806 represents one or more of any of a variety of communication bus structures. By way of example, and not limitation, bus 806 may be implemented as a Peripheral Component Interconnect Express (PCIe) bus. Data processing system 800 typically includes a variety of computer system readable media. Such media may include computer-readable volatile and non-volatile media and computer-readable removable and non-removable media.

Memory 804 can include computer-readable media in the form of volatile memory, such as random-access memory (RAM) 808 and/or cache memory 810. Cache memory 810 may include a level 3 cache memory (not shown) as level 1 and level 2 caches are typically included in processor 802. Data processing system 800 also can include other removable/non-removable, volatile/non-volatile computer storage media. By way of example, storage system 812 can be provided for reading from and writing to a non-removable, non-volatile magnetic and/or solid-state media (not shown and typically called a "hard drive"), which may be included in storage system 812. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 806 by one or more data media interfaces. Memory 804 is an example of at least one computer program product.

Memory 804 is capable of storing computer-readable program instructions that are executable by processor 802. For example, the computer-readable program instructions can include an operating system, one or more application programs, other program code, and program data. The computer readable program instructions can include/implement the particular operations, functions, and/or executable architectures described within this disclosure. For example, the computer readable program instructions may implement the architectures described herein in connection with FIGS. 1, 4, and 6 to perform the operations described in connection with FIGS. 2, 5, and 7.

Processor 802, in executing the computer-readable program instructions, is capable of performing the various operations described herein that are attributable to a computer. It should be appreciated that data items used, generated, and/or operated upon by data processing system 800 are functional data structures that impart functionality when employed by data processing system 800. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor. Examples of data structures as described within this disclosure may include, but are not limited to, source data, partitions, segments, and/or compressed data.

Data processing system 800 may include one or more Input/Output (I/O) interfaces 818 communicatively linked to bus 806. I/O interface(s) 818 allow data processing system 800 to communicate with one or more external devices and/or communicate over one or more networks such as a local area network (LAN), a wide area network (WAN), and/or a public network (e.g., the Internet). Examples of I/O interfaces 818 may include, but are not limited to, network cards, modems, network adapters, hardware controllers, etc. Examples of external devices also may include devices that allow a user to interact with data processing system 800 (e.g., a display, a keyboard, and/or a pointing device) and/or other devices such as an accelerator card. In some cases, the CPU and/or GPU used to perform operations described herein may be disposed on an accelerator card.

Data processing system 800 is only one example implementation. Data processing system 800 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

The example of FIG. 8 is not intended to suggest any limitation as to the scope of use or functionality of example implementations described herein. Data processing system 800 is an example of computer hardware that is capable of performing the various operations described within this disclosure. In this regard, data processing system 800 may include fewer components than shown or additional components not illustrated in FIG. 8 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

The terminology used herein is for the purpose of describing particular embodiments only and is not intended to be limiting. Notwithstanding, several definitions that apply throughout this document are expressly defined as follows.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer-readable storage medium" means a storage medium that contains or stores program instructions for use by or in connection with an instruction execution system, apparatus, or device. As defined herein, a "computer-readable storage medium" is not a transitory, propagating signal per se. The various forms of memory, as described herein, are examples of computer-readable storage mediums. A non-exhaustive list of examples of a computer-readable storage medium include an electronic storage device, a magnetic storage device, an optical storage device, an electromagnetic storage device, a semiconductor storage device, or any suitable combination of the foregoing. A non-exhaustive list of more specific examples of a computer-readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "hardware processor" means at least one hardware circuit. The hardware circuit may be configured to carry out instructions contained in program code. The hardware circuit may be an integrated circuit. Examples of a hardware processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, a controller, and a Graphics Processing Unit (GPU).

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer-readable storage medium or a plurality of computer readable storage mediums having computer-readable program instructions thereon for causing a processor to carry out aspects of the inventive arrangements described herein. Within this disclosure, the term "program code" is used interchangeably with the term "program instructions." Computer-readable program instructions described herein may be downloaded to respective computing/processing devices from a computer-readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer-readable program instructions may include state-setting data. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer-readable program instructions by utilizing state information of the computer-readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer-readable program instructions, e.g., program code.

These computer-readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the operations specified in the flowchart and/or block diagram block or blocks.

The computer-readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flow-chart and/or block diagram block or blocks.

The flowchart and block diagrams in the Figures illustrate the architecture, functionality, and operation of possible implementations of systems, methods, and computer pro- gram products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over tech-nologies found in the marketplace, or to enable others of ordinary skill in the art to understand the embodiments disclosed herein.

What is claimed is:

1. A method, comprising:
subdividing source data into a plurality of partitions;
selecting a partition size for the subdividing based on a search window size of a compression technique and a cache size of a hardware processor, the selecting including calculating a search window factor based on the search window size of the compression technique and the cache size of the hardware processor, and generating a product of the search window size and the search window factor;
wherein a number of the plurality of partitions is selected based, at least in part, on a size of the source data and the partition size;
generating, by the hardware processor, compressed data by performing multi-threaded compression in which a plurality of threads execute the compression technique on the plurality of partitions in parallel resulting in a plurality of segments of compressed data; and
prepending a Random-Access Point (RAP) metadata frame to the plurality of segments of the compressed data, wherein the RAP metadata frame is interpretable by a decompressor to enable multi-threaded and single threaded decompression.

2. The method of claim 1, wherein a number of the plurality of threads is selected based on a maximum number of threads supported by the hardware processor and the number of the plurality of partitions.

3. The method of claim 1, further comprising:
decompressing the compressed data using a single threaded decompressor.

4. The method of claim 1, further comprising:
decompressing the compressed data using a multi-threaded decompressor.

5. The method of claim 1, wherein the RAP metadata frame specifies a number of primary threads and a number of child threads for the plurality of segments.

6. The method of claim 1, wherein the RAP metadata frame specifies offsets, lengths, and decompressed lengths for the plurality of segments.

7. The method of claim 1, wherein the number of the plurality of partitions is further selected based on the search window size of the compression technique.

8. The method of claim 1, wherein the partition size is selected to fit within a smallest level of cache of the hardware processor.

9. The method of claim 1, wherein the partition size is selected based, at least in part, on a comparison of the product of the search window size and the search window factor.

10. The method of claim 1, wherein the search window size or the size of the source data is less than a size of a level 1 cache memory of the hardware processor, the method includes setting the search window factor to a positive integer value such that the product of the search window size and the search window factor is less than the size of the level 1 cache memory.

11. The method of claim 1, wherein the search window size is less than a size of a level 2 cache memory of the hardware processor, the method further comprises:
setting the search window factor to a positive integer value such that the product of the search window size and the search window factor is less than the size of the level 2 cache memory.

12. The method of claim 1, wherein the search window size is greater than or equal to a size of a level 2 cache memory of the hardware processor and less than a size of a level 3 cache memory of the hardware processor divided by a number of cores of the hardware processor that share the level 3 cache memory, the method further comprises:
setting the search window factor to a positive integer value such that the product of the search window size and the search window factor is less than the size of the level 3 cache memory of the hardware processor divided by the number of cores of the hardware pro-cessor that share the level 3 cache memory.

13. The method of claim 1, wherein the search window size is greater than or equal to a size of a level 3 cache memory of the hardware processor divided by a number of cores of the hardware processor that share the level 3 cache memory, the method further comprises:
setting the search window factor to a positive integer value such that the product of the search window size and the search window factor is greater than or equal to the size of the level 3 cache memory of the hardware processor divided by the number of cores of the hard-ware processor that share the level 3 cache memory and less than the size of the source data divided by a number of cores available on the hardware processor.

14. A system, comprising:
a hardware processor; and
one or more computer-readable storage mediums having program instructions stored thereon to cause the hard-ware processor to perform operations comprising:
subdividing source data into a plurality of partitions;

selecting a partition size for the subdividing based on a search window size of a compression technique and a cache size of the hardware processor, the selecting including calculating a search window factor based on the search window size of the compression technique and the cache size of the hardware processor, and generating a product of the search window size and the search window factor;

wherein a number of the plurality of partitions is selected based, at least in part, on a size of the source data and the partition size;

generating, by the hardware processor, compressed data by performing multi-threaded compression in which a plurality of threads execute the compression technique on the plurality of partitions in parallel resulting in a plurality of segments of compressed data; and prepending a Random-Access Point (RAP) metadata frame to the plurality of segments of the compressed data, wherein the RAP metadata frame is interpretable by a decompressor to enable multi-threaded and single threaded decompression.

15. The system of claim 14, wherein the number of the plurality of partitions is further selected based on the search window size of the compression technique.

16. The system of claim 14, wherein the partition size is selected to fit within a smallest level of cache of the hardware processor.

17. The system of claim 14, wherein the partition size is selected based, at least in part, on a comparison of the product of the search window size and the search window factor.

18. The system of claim 14, wherein the search window size or the size of the source data is less than a size of a level 1 cache memory of the hardware processor, and wherein the search window factor is set to a positive integer value such that the product of the search window size and the search window factor is less than the size of the level 1 cache memory.

19. The system of claim 14, wherein the search window size is less than a size of a level 2 cache memory of the hardware processor, and wherein the search window factor is set to a positive integer value such that the product of the search window size and the search window factor is less than the size of the level 2 cache memory.

20. A computer program product comprising:

one or more computer-readable storage mediums having program instructions stored thereon, wherein the program instructions are executable by a hardware processor to cause the hardware processor to initiate operations comprising:

subdividing source data into a plurality of partitions;

selecting a partition size for the subdividing based on a search window size of a compression technique and a cache size of the hardware processor, the selecting including calculating a search window factor based on the search window size of the compression technique and the cache size of the hardware processor, and generating a product of the search window size and the search window factor;

wherein a number of the plurality of partitions is selected based, at least in part, on a size of the source data and the partition size;

generating, by the hardware processor, compressed data by performing multi-threaded compression in which a plurality of threads execute the compression technique on the plurality of partitions in parallel resulting in a plurality of segments of compressed data; and prepending a Random-Access Point (RAP) metadata frame to the plurality of segments of the compressed data, wherein the RAP metadata frame is interpretable by a decompressor to enable multi-threaded and single threaded decompression.

* * * * *